Figure 1:
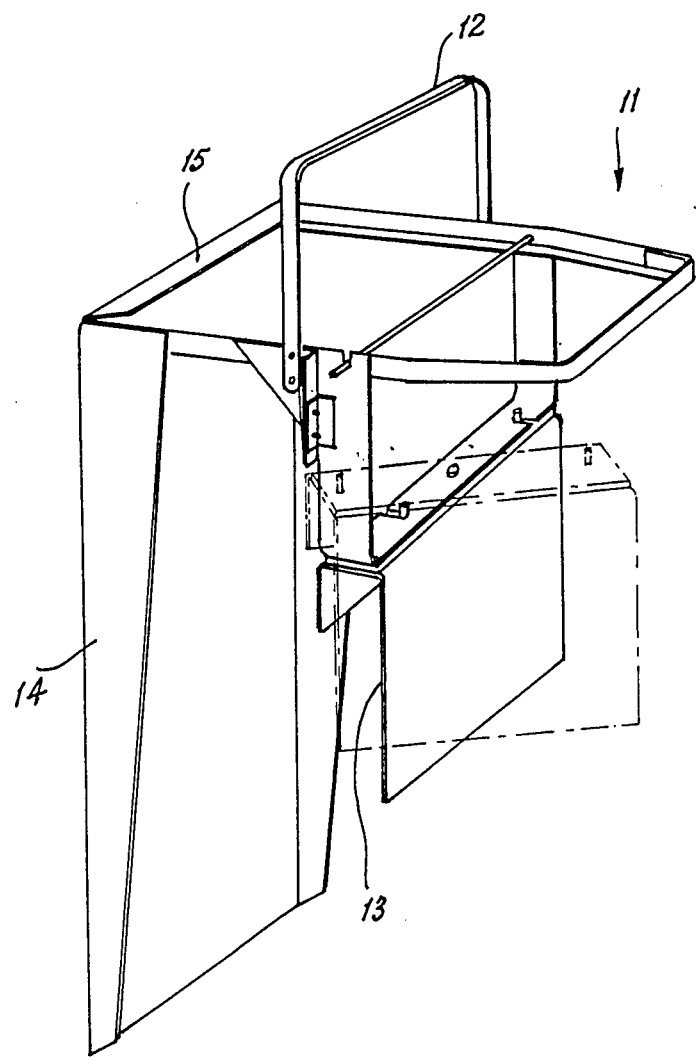

United States Patent [19]

Lloyd

[11] Patent Number: 4,731,259
[45] Date of Patent: Mar. 15, 1988

[54] DESCALING PROCESS

[75] Inventor: David J. Lloyd, Baldivis, Australia

[73] Assignee: Gardner Bros. & Perrott (W.A.) Pty. Ltd., Western Australia, Australia

[21] Appl. No.: 937,343

[22] Filed: Dec. 3, 1986

Related U.S. Application Data

[63] Continuation-in-part of Ser. No. 763,149, Jul. 1, 1985, abandoned.

[30] Foreign Application Priority Data

Nov. 1, 1983 [AU] Australia .............................. PG2145
Oct. 31, 1984 [WO] PCT Int'l Appl. ................... PCT/AU84/00220

[51] Int. Cl.⁴ .......................... B05D 5/08; F16L 58/10
[52] U.S. Cl. .................................... 427/155; 427/156; 427/409; 427/410; 427/239
[58] Field of Search .............. 427/239, 154, 155, 156, 427/409, 410; 252/180

[56] References Cited

U.S. PATENT DOCUMENTS 2,893,900  7/1959  Machlig .............................. 427/239
3,799,797  3/1974  Hughes ............................... 252/180
4,338,363  7/1982  Gill ..................................... 427/387
4,349,586  9/1982  Sejournant ........................ 427/15 R

FOREIGN PATENT DOCUMENTS 0085873  5/1984  Japan ................................. 427/156
239480  3/1969  U.S.S.R. ............................. 427/156

OTHER PUBLICATIONS

I&EC Product Research & Development, pp. 306–309, vol. 8, Sep. 1969.

Primary Examiner—Sam Silverberg
Attorney, Agent, or Firm—Harness, Dickey & Pierce

[57] ABSTRACT

The descaling of surface of processing equipment, vessels and piping on which scale, such as that which occurs in the extraction of alumina from bauxites has formed. The surface is cleaned to ensure that it is entirely free of contaminants and then is coated with a suitable resin such as an epoxy resin which is cross linked and thermosetting. The coating may be applied in two or more layers using the same or a different resin. The final layer may be one which readily detaches from the base coating when subjected to a high pressure fluid blast.

13 Claims, 2 Drawing Figures

DESCALING PROCESS

This application is a continuation-in-part of my application entitled "Descaling Process", Ser. No. 763,149, July 1, 1985 abandoned.

THIS INVENTION relates to the descaling of containment vessels and/or conduits for caustic liquors.

Many industrial processes require the use of alkali reagents and/or result in the production of alkaline products. Such reagents and/or products present a problem due to their reactivity with the containment vessels and conduits by the reagents and/or products and the tendancy for scale formation on the walls of the containment vessel or conduits. One particular area of difficulty relates to the Bayer process for the production of alumina from bauxite. The process utilises a hot solution of sodium hydroxide which is very reactive with exposed metal surfaces and results in the formation of a tenacious scale which is strongly adherent to steel surfaces and normally requires the use of jack hammers or like impact devices.

It is an object of the invention to provide a coating for application to the surface of containment vessels or conduits which accommodate caustic liquors to protect the surface from caustic attack and provide low adherence for scales and the like.

Accordingly the invention resides in a coating for surfaces subject to contact with caustic liquors comprising a coating capable of bonding with the metal surface whereby, the bond is resistant to caustic attack the coating is resistant to penetration by the caustic liquor and the outer surface of the coating provides no active interreation with the caustic liquor such that any scale formation is merely passive.

Passive adhesion occurs when sediment settles on the surface and is cemented together to form a scale which is not bonded to the surface.

In another form the invention resides in a method of preparing processing equipment, containment vessels, conduits, piping and the like components to facilitate descaling of surfaces which are subject to the reactive effects of caustic liquors comprising cleaning the surface to remove substantially all surface contaminants, applying a coating to the surface which will bond with the surface to form a bond which is resistant to caustic attack and high pressure fluid blasting, said coating being resistant to penetration by caustic liquor and providing a surface which is not reactive to the caustic liquor to promote the formation of scale thereon.

According to a preferred feature of the invention the coating comprises a resin which is both cross-linked and thermo-setting and comprises an epoxy resin or urethane resin or a combination of both resins.

According to a further preferred feature of the invention the coating comprises at least two coats wherein the outer most coating is separable from the lower coating during descaling.

The invention will be more fully understood in the light of the following description of one specific embodiment.

The embodiment is directed to the treatment of the surfaces of containment vessels used in the Bayer process to provide resistance to caustic attack by the reaction liquors and to facilitate the removal of scale from the surface. The embodiment initially comprises the cleaning of the surface. Such cleaning may be effected by any suitable method such as blast cleaning and acid pickling. A preferred method of cleaning is abrasive blast cleaning involving a combination of wet and dry abrasive blast cleaning. The usual surface contaminants which require removal comprise millscale, corrosion products, process liquors and scales, and finally water soluable salts.

The cleaned surface is then coated with three coats of resin. Each coat of which comprises a cross-linked thermo-setting epoxy or urethane resin which will resist penetration of the caustic reagent. The coating may be applied by any suitable means such as a brush, or roller, or spraying.

The first coat which is applied comprises an amine adduct cured epoxy resin or a polyamide cured epoxy resin which contains 50% (by volume) of solids. The second coat may comprise the same resins as the first coat or an amine adduct cured epoxy resin modified by the addition of a fluorocarbon resin. The final coat comprises a amine adduct cured epoxy resin modified by the addition of a fluorocarbon resin or a silicone resin and contains 50% (by volume) of solids or Bisphenol A resin.

The first coat forms a bond with the cleaned surface of the reaction vessel which is resistant to caustic attack while the nature of each of the coats prevents penetration of the caustic through the coating. The final coat provides a surface for contact with the caustic liquor of the Bayer process and is substantially unreactive therewith such that any scale deposition is merely passive. In addition by virtue of the modification of the composition of the final coat with a fluorocarbon or silicone resin or using Bisphenol A resin the final coat has a relatively low degree of adherence to any scale deposition. The final coat also has a somewhat reduced adherence to the second coat. Therefore in the event of a tenacious adherence developing between the scale and the final coat the final coat will separate from the coating.

To facilitate a better understanding of the embodiment a particular example thereof is now described.

(a) Surface Preparation

The surfaces of several pieces of steel plate were dry abrasive blast cleaned to a standard equivalent to Australian Standard AS1627.4 Class 3.

(b) Coating Application

The first coat of the selected coating system was applied to the blasted steel to achieve a dry film thickness of first coat of 150–200 microns.

The second coat of the selected coating system was applied 24 hours after the first coat to achieve a dry film thickness of second coat of 150 to 200 microns.

The third and final coat of the selected coating system was applied 24 hours after the second coat to achieve a dry film thickness of top coat of 75 to 150 microns.

The steel plates were then cured by standing 5–7 days at ambient temperatures or subjected to an accelerated cure at 50° C. for 16 hours.

The coating systems which were applied are tabulated below:

| | COATING SYSTEMS SELECTION | | |
|---|---|---|---|
| No. | 1st Coat | 2nd Coat | Top Coat |
| 1 | Epoxy A | Epoxy A | Teflon Epoxy |
| 2 | Epoxy B | Epoxy B | Teflon Epoxy |
| 3 | Epoxy B | Epoxy B | Silicone Epoxy |
| 4 | Epoxy A | Teflon Epoxy | Silicone Epoxy |

-continued

| COATING SYSTEMS SELECTION | | | |
|---|---|---|---|
| No. | 1st Coat | 2nd Coat | Top Coat |
| 5 | Epoxy A | Epoxy A | Silicone Epoxy |
| 6 | Epoxy B | Epoxy B | Bisphenol A Resin |

Epoxy A is an amine adduct cured epoxy resin: containing 50% (by volume) of solids. An example of Epoxy A comprises Taubmans hot water resistant epoxy manufactured from Dow DER 671×75 epoxy resin and Taubmans T3491 amine adduct curing agent.

Epoxy B is a polyamide cured epoxy resin: containing 50% (by volume) of solids.

Teflon Epoxy is an amine adduct cured epoxy modified by the addition of fluorocarbon resin and contains 50% (by volume) of solids. An example of a Teflon epoxy comprises one manufactured from Dow DER 671×75 epoxy resin and using Taubmans T3491 amine adduct curing agent with Dow teflon resin.

Silicon Epoxy is an amine adduct cured epoxy modified by the adaption of silicon resin and contains 50% (by volume) of solids. An example of such a resin can be manufactured from Dow DER 671×75 epoxy resin with Taubmans T911 amine adduct curing agent and Dow silicone resin.

(c) Immersion of Coated Panel in a Caustic Liquor

The coated panels were immersed in a meta stable solution of alumina hydrate in caustic liquor, and scale was allowed to grow on the surface. For each coating system, there was also an uncoated panel placed in the liquor as a control. The steel plates were semi-immersed in the liquor for a period of three months, during which time scale formed on the surfaces above and below the liquor level. The apparatus used for suspending the plates in the liquor is shown in FIG. 1 of the accompanying drawings. It comprises a supporting frame 11 fitted with a handle 12 and a U-shaped member 13 adapted to set on the upper edge of a tank (not shown) containing the liquor. The steel plate 14 is suspended from the supporting frame by means of bolts to frame 11.

(d) Descaling of the Steel Plates

Figure 2:
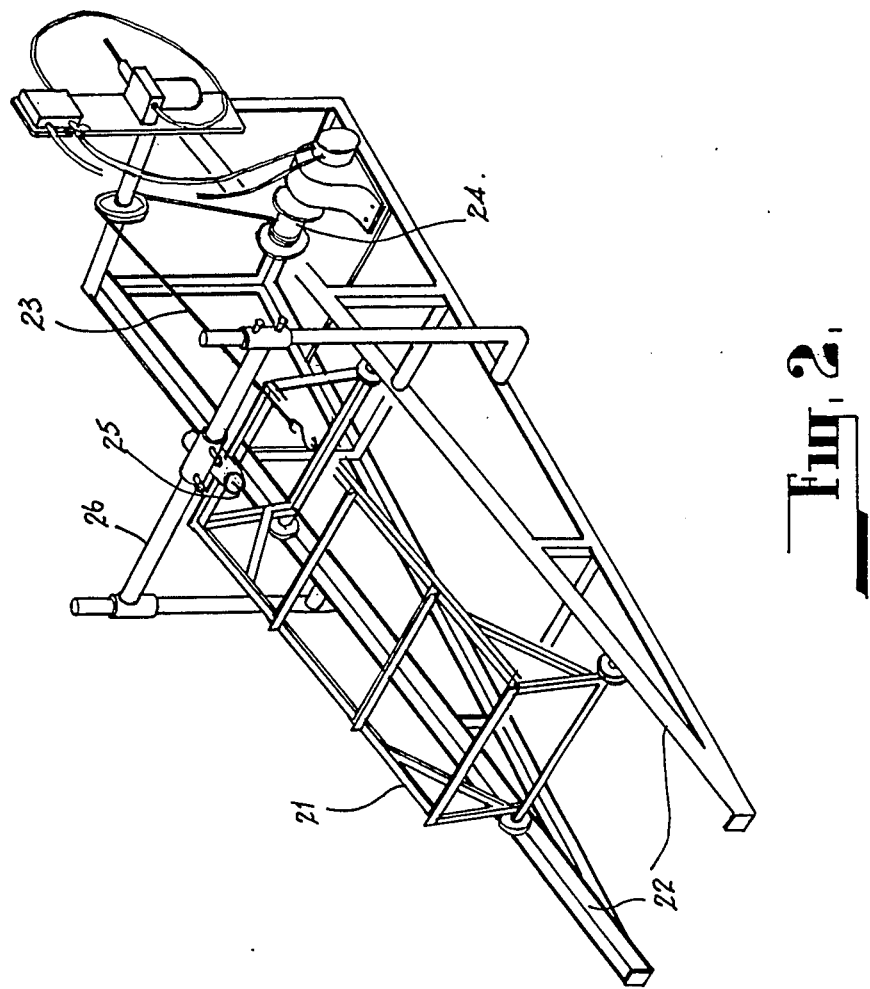

This was carried out on a ramp as shown in FIG. 2 of the accompanying drawings whereby a fan nozzle was operated at measured distances and speed over the surface at a pre-set fluid pressure. The plate (not shown) is supported on a wheeled trolley 21 which moves up and down a inclined track 22 being connected to one end of a cable 23 the other end of which is wound onto the drum 24 of a hydraulically driven winch. A nozzle 25 is carried on a bridge 26 under which the trolley passes. Means are provided for varying the angle of the nozzle.

The plate was traversed past the stationary nozzle, beginning at the end held above the fluid. The pressure and speed of traverse were varied until the conditions of comfortable removal of the scale were determined. Detailed below in the table are the results of six coating systems selected for demonstrating the invention.

TABLE I

SCALE REMOVAL CONDITIONS FOR COATED AND UNCOATED STEEL PLATE USING HIGH PRESSURE WATER THROUGH A 30° NO. 15 FAN NOZZLE TIP

| Panel | Water Pressure | Incident Angle | Fan Length | Plate Speed |
|---|---|---|---|---|
| Uncoated | 12,500 psi | 60° | 18 mm | 1.5 m/min |
| Coating System 1 | 8,000 | 10° | 70 | 1.5 |
| Coating System 2 | 8,000 | 10° | 70 | 1.5 |
| Coating System 3 | 10,000 | 10° | 70 | 1.5 |
| Coating System 4 | 10,000 | 10° | 70 | 1.5 |
| Coating System 5 | 10,000 | 10° | 70 | 1.5 |
| Coating System 6 | 8,000 | 10° | 70 | 1.5 |

Note: The incident angle to the surface is the angle between the nozzle and the horizontal plain.

It is readily apparent from Table I that far greater forces are required to remove scale from uncoated than from coated panels. The scale was delaminated from the coating in pieces that were "levered" from the surface whereas the scale was worn or abraded from the surface of the uncoated panel. It will be appreciated that the mode of scale removal can be changed by application of the coating. These changes in mode of removal can be presented in absolute terms, such as rate of descaling, force required to remove the scale and energy output required. These are detailed below:

TABLE II

| Panel | Descale Rate | Vertical Force N/mm | Horizontal Force N/mm | Energy Output |
|---|---|---|---|---|
| Uncoated | 1.35²/hr | 17.46 | 10.08 | 20.0 KNM |
| Coating System 1 | 5.40 m²/hr | 0.61 | 3.45 | 3.5 KNM |
| Coating System 2 | 5.40 m²/hr | 0.61 | 3.45 | 3.5 KNM |
| Coating System 3 | 5.40 m²/hr | 0.76 | 4.34 | 4.4 KNM |
| Coating System 4 | 5.40 m²/hr | 0.76 | 4.34 | 4.4 KNM |
| Coating System 5 | 5.40 m²/hr | 0.76 | 4.34 | 4.4 KNM |
| Coating System 6 | 5.40 m²/hr | 0.61 | 3.45 | 3.8 KNM |

The advantages of the invention are clear from Table II. In addition it has been established that the descale rate for uncoated panels is inversely proportional to the thickness of the scale (i.e. with double the thickness the descaling rate is reduced by 50%). On the other hand panels coated in accordance with the invention have the same descaling rate with increasing thicknesses of scale until a thickness is achieved where the applied pressure of water is unable to break the scale.

EXAMPLE 2

Steel plate covered with scale and impregnated with process liquor was removed from an operating plant. The coating systems were applied to the immersed surfaces of the steel plate to demonstrate the ability of the invention to be applied to existing equipment. The method was applied as follows:

(a) Surface Preparation

The surface of the steel was inhibited web abrasive blast cleaned to a standard equivalent to Australian Standard AS1627.4 Class 3.

The wet blasted surface was dry abrasive blast cleaned to the same standard.

(b) Coating Application

The application procedures and systems were identical to those used in Example I.

(c) Immersion of Coated Panel in Liquor

The steel panels were returned to their original position in the process and scale was allowed to grow on the surface both above and below the liquor.

(d) Descaling of Steel Panels

During a normal shut down of the plant, the coated sections of steel plate were descaled using the high pressure water conditions detailed in Example I. All the coated plate was readily descaled while the scale was not removed from uncoated sections of steel plate.

The claims defining the invention are as follows:

1. A method of preparing processing equipment vessels, conduits, piping and the like to facilitate descaling surfaces which are subject to the reactive effects of caustic liquors comprising cleaning the surface to remove substantially all surface contaminants, applying a coating to the surface comprised of at least a base coat which will bond with the surface and an outer coat that reacts to the preceding coat to form a bond therewith said outer coat being resistant to caustic attack and to high pressure fluid blasting, said coating being resistant to penetration by caustic liquor and providing an outer surface which is not reactive to the caustic liquor to promote the formation of scale thereon.

2. A method as set forth in claim 1 further including the step of cleaning the vessel or the like after the formation of scale on the outer surface of the coating by subjecting the surface to a high pressure fluid blast in a direction transverse to its surface for levering the scale formed thereon off of said coating.

3. A method as claimed in claim 1 wherein the coating is applied in at least three coats.

4. A method as claimed in claim 3 wherein the outer coat is such that it readily detaches from the preceding coat.

5. A method as claimed in claim 4 wherein the coating has a minimum dry film thickness of 500 microns.

6. A method as claimed in claim 1 wherein the surface is cleaned by wet and/or dry abrasive blast and acid pickling.

7. A method as claimed at claim 2 wherein the base coat is selected from the group comprising an amine adduct cured epoxy resin and a polyamide cured epoxy resin.

8. A method as claimed at claim 2 wherein the outer coat comprises an amine adduct cured epoxy resin modified by the addition of a resin selected from the group comprising a fluorocarbon resin or a silicone resin.

9. A method as claimed at claim 7 wherein the top coat comprises an amine adduct cured epoxy resin modified by the addition of a resin selected from the group comprising fluorocarbon resin, a silicone resin, and Bisphenol A resin.

10. A method as claimed at claim 9 wherein the coating also comprises an intermediate coat selected from the group comprising an amine adduct cured epoxy resin, a polyamide cured epoxy resin and an amine adduct cured resin modified by the addition of a fluorocarbon resin.

11. A method as claimed at claim 10 wherein the base coat has a dry film thickness of 150–200 microns, the top coat has a dry film thickness of 75–150 microns and the intermediate coat has a dry film thickness of 150–200 microns.

12. A method as claimed in claim 11 wherein the coating is cured for 5 to 7 days at ambient temperatures or for 16 hours at 50° C.

13. A method as set forth in claim 9 further including the step of cleaning the vessel or the like after the formation of scale on the outer surface of the coating by subjecting the surface to a high pressure fluid blast in a direction transverse to its surface for levering the scale formed thereon off of said coating.

* * * * *